Patented Oct. 11, 1938

2,132,398

UNITED STATES PATENT OFFICE 2,132,398

SHORTENING AND PROCESS OF MAKING SAME

Herbert S. Coith, Albert S. Richardson, and Verling M. Votaw, Wyoming, Ohio, assignors to The Procter & Gamble Company, Cincinnati, Ohio, a corporation of Ohio No Drawing. Application May 17, 1934, Serial No. 726,175

26 Claims. (Cl. 99—123)

Our invention relates to shortening and the process of making same.

The main object of our invention is to provide an improved plastic shortening for use in the production of cakes of improved appearance and eating qualities, particularly with respect to a uniformly light and tender texture in combination with high sugar content. Moistness, sweetness, and tenderness are highly prized in cakes, and are obtained in increasing degree as the ratio of sugar to flour in shortened cakes is increased and moisture is added. However, as these changes are made, the finished baked cake tends to become smaller in volume and heavier in texture, until a point is reached where the cake falls at the end of baking to the extent of being classed as sad, sometimes even a complete failure. In practice, this tendency to shrink or fall limits the amount of sugar which may be successfully incorporated in cakes. In shortened cakes manufactured in commercial bakeries prior to the present invention, it was common practice to limit the amount of sugar to less than the amount of flour, notwithstanding the fact that more sugar and along with it increased moisture would have been desirable from the standpoint of the sweetness, moistness, and good keeping quality. It is the object of our invention to provide a shortening which overcomes, or in large measure counteracts, this tendency of cakes to fall as the ratio of sugar to flour is increased, and which makes practical the production of shortened cakes with a proportion of sugar at least equal to and preferably larger than the proportion of flour, also with a high content of milk or other aqueous ingredients, without sacrifice of the light texture which is essential to high quality. Shortening made in accordance with our invention is particularly valuable for use in the making of cakes in commercial bakeries; for reasons not fully understood the large scale mechanical mixing methods of commercial cake making tend on the average to develop the faults heretofore associated with high sugar content even more than the household methods of mixing cake batter on smaller scale.

While our shortening is valuable mainly for use in cakes containing at least as much sugar as flour, its retarding effect on shrinkage is appreciable in various other baked products and it is an excellent shortening agent for general use.

We have already disclosed in our copending applications, Serial Numbers 655,292 and 655,293, filed February 4, 1933, of which the present application is a continuation in part, that the objects set forth above may be obtained by incorporating in the cake batter in suitable quantity a plastic shortening containing monoglyceride.

The present invention is the result of extensive experiments to determine how the shrinkage of freshly baked cakes of high sugar content is affected by incorporating in plastic shortening the various fatty esters containing unesterified hydroxyl groups, not only those derived from glycerin but also those derived from other polyhydric alcohols.

We have found that the most effective of the hydroxy fatty esters for purposes of decreasing shrinkage of cakes are in general those which contain two or more unesterified hydroxyl groups per molecule. While we do not represent all hydroxy fatty esters containing only one unesterified hydroxyl group to be without any stabilizing action on the volume of cakes made with high sugar content, we have found a number of them to be ineffective and have found none of them to compare favorably in efficiency with an equal weight of the corresponding ester containing two unesterified hydroxyl groups per molecule.

More specifically the broad class of effective reagents which we have found to improve plastic shortening in the sense described above may be described as esters having a molecular formula containing at least two unesterified hydroxyl groups and consisting of polyhydric alcohol incompletely esterified with fatty acid. At least one of the unesterified hydroxyl groups in such a molecular complex resides in the polyhydric alcohol radical. Our investigations lead us to the conclusion that these structural elements in a fatty ester incorporated in plastic shortening are sufficient to ensure a high degree of efficiency in the prevention of cake shrinkage. The quantity of the hydroxy fatty ester in the shortening may be arbitrarily varied within wide limits. The reagents made by known methods differ somewhat in their effectiveness. We prefer in practical operation to use at least about 2% of the special ester based on the total shortening, but a demonstrable improvement in the shortening action of a plastic fat usually results from the use of even smaller amounts. If more than one hydroxy ester is used in the shortening, the improvement is substantially additive and the quantity of each reagent may be reduced accordingly.

The main body of hydroxy fatty esters suitable for use in our shortening consists of the monoglycerides and the corresponding fatty esters of those polyhydric alcohols which have a molecular formula containing more than three carbon atoms. No specific claim to the incorporation of monoglycerides in cakes is made in the present application, this being part of the subject matter of our copending application, Serial No. 655,295.

In the case of fatty esters of polyhydric alcohols of more than three carbon atoms, the alcohol radical may be of simple type, e. g., sorbitol or mannitol, or it may be complex in type, e. g., xylose, fructose, or citric acid. The carbon atoms of the polyhydric alcohol radical may be linked directly together, as in the above examples, or indirectly as in the ether linkage of sucrose or diglycerol.

The fatty acid radicals of the requisite esters are those of the characteristic higher fatty acids which may be derived from any of the commercially known edible fats and oils, but on account of flavor we prefer to use esters of fatty acids of molecular formula containing predominantly sixteen or more carbon atoms. However, the corresponding esters of the $C_6$ to $C_{14}$ fatty acids, such as occur in coconut oil, are also effective in preventing cake shrinkage and may be used in such proportions as are found by empirical test not to be objectionable in flavor.

The method of preparing the hydroxy fatty esters does not as such constitute a part of the present invention. The esters of glycerol and the polyglycerols are readily prepared by direct esterification, a well-known procedure. Most of the other polyhydric alcohols, particularly the sugars, are best esterified by use of the fatty acid chlorides, according to procedures recorded in the literature. The reaction product is in general a mixture of isomers.

The diglyceride of ricinoleic acid is an example of one of our reagents having a molecular complex in which only one of the unesterified hydroxyl groups resides in the polyhydric alcohol radical itself. A special case of such a compound is one with a formula containing a hydroxyl group as a part of a carboxyl group, such as result from esterifying tartaric acid, citric acid, and the like with chlorides of the fatty acids.

We have found that the triglycerides of hydroxy acids, both saturated and unsaturated, are not generally effective for preventing cake shrinkage, even though such esters contain two or more unesterified hydroxyl groups per molecule. The mono fatty acid esters of glycols and polyglycols are not effective. Use of these ineffective esters in shortening, of course, does not come within the scope of any claim to the present invention. Diglycerides in plastic shortening are claimed in the present application only to the extent that their efficiency may be augmented by the presence of unesterified hydroxyl groups outside the glyceryl radical.

In the preferred practice of the invention the major portion of the shortening in which we incorporate the hydroxy fatty ester consists of a mixture of solid and liquid glycerides. For instance, we may intimately mix into a naturally plastic triglyceride such as lard a suitable proportion of the hydroxy fatty ester, usually between 2% and 6% of the total shortening agent. Alternatively, triglyceride fats from different sources, together with the synthetic hydroxy fatty ester, are blended in controlled proportions so as to produce a fatty mixture which is plastic either over the whole range of ordinary temperature or at the specific temperature at which it is desired to use the shortening agent. The hydroxy fatty ester in the shortening may be either solid or liquid, provided it is essentially of the character specified above, but the shortening as a whole should be plastic in order to give the best results when incorporated in the batter or dough to be baked.

Like other plastic shortenings, those made in accordance with the present invention contain a larger proportion of liquid than of solid ingredients. The solid fat may be regarded as a stiffening agent intimately dispersed in liquid fat or oil. We prefer to rely mainly on solid triglyceride fat as the stiffening agent in our shortening, but if the added hydroxy fatty ester is solid, it contributes also to the stiffening effect. In the extreme case our shortening may consist of a mixture of a solid monoglyceride such as monostearin and a fatty oil such as cottonseed or peanut oil, which is normally liquid at ordinary temperature. However, for reasons which we do not attempt to explain, our observations show that this mixture may be less efficient in preventing shrinkage of cakes than the corresponding plastic shortening in which the major portion of the hard fat is triglyceride.

Monoglycerides and certain other hydroxy esters have already been proposed for use as stabilizing agents in emulsions containing fatty oils and water. There is no close correspondence between such stabilizing action and the effectiveness of these reagents in the practice of the present invention. A number of hydroxy fatty esters not found effective for inhibiting cake shrinkage are quite effective as emulsifying agents. Also the quantity required for best results in practice of the present invention is ordinarily several fold greater than the optimum quantity for stabilizing emulsions. Nevertheless, we do not in the present application make any claim to emulsions of fat and water. The invention as claimed herein contemplates only the improvement of those shortening agents that are commonly manufactured and sold in substantially dry and plastic or semi-solid form, especially lard, partially hydrogenated vegetable oil, and shortening of the type commonly known as compound which is a blend of a fatty oil with a smaller amount of very hard fat, it being understood that the expression "substantially dry" as applied to a shortening is intended to exclude margarin or any other emulsion of fat with water or aqueous material in which the water contributes an essential property to the shortening.

While it is possible to prepare the shortenings described herein by forming separately a plastic blend of triglyceride fat and intimately incorporating therewith the essential hydroxy fatty ester, we prefer in general to melt together all the ingredients of the shortening and thereafter cool and vigorously agitate in order to partially solidify and plasticize the mixture.

Shortening made in accordance with the present invention is particularly valuable for use in high sugar cakes containing a chemical leavening agent, like the so-called layer cakes, but also tends to retard shrinkage of other cakes, e. g., the so-called pound cakes depending mainly on incorporation of air for a leavening effect.

We find it of some advantage to incorporate in our shortenings, in addition to the hydroxy fatty ester, a still smaller quantity of free fatty acid and/or soap. The stabilizing effect of such a combination on the volume of cakes containing the shortening is rather more than the additive effect of the ingredients when used separately, but free fatty acid or soap is not essential to successful practice of the invention and no claim is made to the incorporation of either of these ingredients as such in shortening except as an accessory reagent along with the special hydroxy ester.

The following examples are intended clearly to illustrate the nature of our invention, but the actual composition of the shortening can be varied within much wider limits, as already indicated in the foregoing explanation.

Example 1

| | Per cent |
|---|---|
| Cottonseed oil | 84 |
| Hydrogenated cottonseed oil of 15 iodine value | 12 |
| Monoglyceride of cottonseed oil | 4 |

Example 2

| | Per cent |
|---|---|
| Cottonseed oil | 42.5 |
| Sesame oil | 42.5 |
| Hydrogenated cottonseed oil of 15 iodine value | 9.0 |
| Monoglyceride of hydrogenated cottonseed oil of 15 iodine value | 6.0 |

Example 3

| | Per cent |
|---|---|
| Cottonseed oil | 44 |
| Edible tallow | 50 |
| Monoglyceride of hydrogenated tallow of 10 iodine value | 6 |

Example 4

| | Per cent |
|---|---|
| Hydrogenated peanut oil of 75 iodine value | 97 |
| Sucrose monostearate | 3 |

Example 5

| | Per cent |
|---|---|
| Hydrogenated cotton seed oil of 70 iodine value | 98 |
| Esterification product of equimolar mixture of diglycerol and fatty acids of hydrogenated cottonseed oil of 70 iodine value | 2 |

Example 6

| | Per cent |
|---|---|
| Hydrogenated cottonseed oil of 70 iodine value | 97 |
| Monoglyceride of ricinoleic acid | 3 |

Example 7

| | Per cent |
|---|---|
| Hydrogenated cottonseed oil of 70 iodine value | 98 |
| Stearate of tartaric acid | 2 |

Each of the above mixtures is partially solidified from the molten condition and vigorously agitated in accordance with the usual procedure for forming plastic fats.

As further examples of hydroxy fatty esters suitable for use in practice of the present invention we may mention fructose monostearate, monostearate of triglycerol, mannitol monostearate, or diglyceride of ricinoleic acid.

Incorporation of the shortenings described in cakes containing more sugar than flour commonly results after baking and cooling in a cake volume from 10% to 25% greater than that of the corresponding cakes made with the corresponding triglyceride shortening without addition of the hydroxy fatty ester. As one example of a cake formula in which the shortening of the present invention is markedly superior to the corresponding triglyceride shortening, we cite the following recipe for a white layer cake:

| | Lbs. | Ozs. |
|---|---|---|
| Flour | 1 | 0 |
| Shortening | | 8 |
| Sugar | 1 | 7½ |
| Salt | | ½ |
| Baking powder | | ¾ |
| Milk | 1 | 0 |
| Egg whites | | 10 |
| Vanilla | | ¼ |

The first two ingredients are mixed together at low speed in a Hobart or similar mixing machine. At the end of three minutes the sugar, salt, baking powder and half the milk are added and mixing continued at low speed for another three minutes. Finally, the eggs, vanilla, and the remainder of the milk are added and a final mixing period of three minutes at low speed is given. Baking is carried out at 375° F.

In our copending application Serial No. 726,174, filed concurrently herewith, is described and claimed the employment in baked products of the hydroxy esters hereinbefore referred to; no claim is made in this application to such products.

It will be understood that, where the hydroxy fatty esters in the above examples are specified in terms of their chemical formula, e. g., mono-olein or sucrose stearate, it is not necessary that chemically pure materials be used, since satisfactory results are obtained without any elaborate purification of the reaction product of the known methods for making these materials.

It will also be appreciated that the recital in the claims appended hereto of the term "ester" is intended to cover a mixture of esters falling within the stated definition; for instance, several esters of different polyhydroxy alcohols and/or different fatty acids are obviously contemplated unless restrictive language is used.

Having thus described the invention, what is claimed as new and desired to be secured by Letters Patent is:

1. A process for improving substantially dry plastic shortening which consists in embodying therein along with a major proportion of triglyceride fat a smaller proportion of hydroxy fatty ester predominantly of molecular formula containing at least two unesterified hydroxyl groups and consisting of polyhydroxy substance of molecular formula containing more than three carbon atoms incompletely esterified with higher fatty acid, the amount of the hydroxy fatty ester being sufficient to effect substantial reduction in shrinkage at the end of baking of cakes containing more sugar than flour in which the shortening is incorporated.

2. A process for producing substantially dry plastic shortening which consists in intimately blending not more than 98% triglyceride fats together with not less than 2% synthetic derivative of polyhydric alcohol and higher fatty acid combined in such proportions as to yield essentially esters of molecular formula containing two or more unesterified hydroxyl groups, at least one of which resides in the polyhydric alcohol radical.

3. The process claimed in claim 1, in which the hydroxy fatty ester is a polyglycerol incompletely esterified with fatty acid.

4. The process claimed in claim 1, in which the polyhydroxy substance from which the hydroxy fatty ester is derived comprises a sugar.

5. A substantially dry plastic shortening consisting essentially of solid and liquid triglycerides and a smaller proportion of hydroxy fatty ester having a molecular formula containing at least two unesterified hydroxy groups and consisting of polyhydric alcohol incompletely esterified with higher fatty acid, the amount of the hydroxy fatty ester being sufficient to effect substantial reduction in shrinkage at the end of baking of cakes containing more sugar than flour in which the shortening is incorporated.

6. The shortening claimed in claim 5, in which the polyhydroxy substance is a polyglycerol.

7. A blended substantially dry plastic shortening consisting essentially of solid and liquid fatty esters of which the major portion is triglyceride and at least about 2% is derived from polyhydric alcohol and higher fatty acid combined in such proportion as to yield esters of molecular formula containing two or more unesterified hydroxyl groups, at least one of the unesterified hydroxyl groups residing in the polyhydric alcohol radical.

8. The shortening claimed in claim 7, in which the major portion of the fat consists of partially hydrogenated vegetable oil and in which the hydroxy fatty ester is derived from a polyhydric alcohol having a molecular formula containing more than three carbon atoms.

9. The shortening claimed in claim 7, in which the hydroxy fatty ester is derived predominantly from fatty acids of molecular formula containing not less than sixteen carbon atoms.

10. The process claimed in claim 1, in which the polyhydroxy substance from which the added ester is derived comprises sucrose.

11. A substantially non-aqueous blended plastic shortening comprising a major proportion of triglyceride fat and a relatively small amount of sucrose monostearate, the amount of sucrose monostearate being sufficient to effect substantial reduction in shrinkage at the end of baking of high sugar cake in which the shortening is employed.

12. A substantially non-aqueous plastic shortening comprising a mixture of triglyceride fat with a smaller amount of an ester having a molecular formula containing at least two unesterified hydroxyl groups and consisting of a polyhydric alcohol having more than three carbon atoms incompletely esterified with higher fatty acid.

13. The method of improving lard for use as a shortening for high sugar cakes, which comprises adding thereto a relatively small amount of an hydroxy fatty ester having a molecular formula containing at least two unesterified hydroxyl groups and consisting of a polyhydric alcohol having more than three carbon atoms incompletely esterified with higher fatty acid.

14. A substantially dry, plastic shortening comprising a mixture of triglyceride fat with a small amount of an ester having a molecular formula containing at least two unesterified hydroxyl groups and consisting of a polyhydric alcohol having more than three carbon atoms incompletely esterified with higher fatty acid, and a small amount of free fatty acid.

15. A substantially dry, plastic shortening comprising a mixture of triglyceride fat with a small amount of an ester having a molecular formula containing at least two unesterified hydroxyl groups and consisting of a polyhydric alcohol having more than three carbon atoms incompletely esterified with higher fatty acid, and a small amount of soap.

16. A process for improving substantially dry plastic shortening for use in sweet baked goods containing more sugar than flour which consists in embodying therein along with a major proportion of triglyceride fat a smaller proportion of hydroxy fatty ester predominantly of molecular formula containing at least two unesterified hydroxyl groups and consisting of a polyhydroxy substance of molecular formula containing more than three carbon atoms incompletely esterified with higher fatty acid, the amount of the hydroxy fatty ester being sufficient to effect substantial reduction in shrinkage at the end of baking of cakes containing more sugar than flour in which the shortening is incorporated.

17. A blended, substantially dry plastic shortening for use in sweet baked goods containing more sugar than flour and consisting essentially of solid and liquid triglycerides and a smaller proportion of hydroxy fatty ester having a molecular formula containing at least two unesterified hydroxyl groups and consisting of a polyhydroxy substance of molecular formula containing more than three carbon atoms incompletely esterified with higher fatty acid, the amount of the hydroxy fatty ester being sufficient to effect substantial reduction in shrinkage at the end of baking of cakes containing more sugar than flour in which the shortening is incorporated.

18. A blended, substantially dry plastic shortening for use in sweet baked goods containing more sugar than flour and consisting essentially of solid and liquid fatty esters of which the major portion is triglyceride and at least about 2% is derived from polyhydric alcohol and higher fatty acid combined in such proportion as to yield esters of molecular formula containing two or more unesterified hydroxyl groups, at least one of the unesterified hydroxyl groups residing in the polyhydric alcohol radical.

19. A substantially dry plastic shortening composition adapted for use in a cake batter emulsion comprising an oleaginous material having dispersed therein a higher fatty acid polyglyceride predominantly of molecular formula containing at least two unesterified hydroxyl groups.

20. A substantially dry plastic shortening composition comprising an oleaginous material having dispersed therein a higher fatty acid polyglyceride of molecular formula containing at least two unesterified hydroxyl groups, said polyglyceride functioning to effect a substantial increase in the volume of cakes prepared with the shortening and from a batter containing unusually large amounts of sugar and moisture relative to flour.

21. A blended plastic shortening comprising at least about 2% fatty ester having a molecular formula containing at least two unesterified hydroxyl groups and consisting of polyhydric alcohol incompletely esterified with higher fatty acid, the remainder of the shortening consisting essentially of triglyceride of higher fatty acid, the said fatty ester functioning to effect substantial increase in the volume of cakes prepared with the shortening and from a batter containing much more sugar than flour.

22. A substantially dry plastic shortening comprising a major portion of triglyceride fat and a smaller amount of hydroxy fatty ester consisting of a polyhydroxy substance of molecular formula containing more than three carbon atoms incompletely esterified with higher fatty acid, the amount of the hydroxy fatty ester being sufficient to effect substantial reduction in shrinkage at the end of baking of cakes containing more sugar than flour in which the shortening is incorporated.

23. The shortening claimed in claim 22 in which the polyhydroxy substance is a polyglycerol.

24. The shortening claimed in claims 22 in which the polyhydroxy substance is a sugar.

25. A substantially dry plastic shortening comprising a major portion of triglyceride fat and a smaller amount of hydroxy fatty ester derived from a polyhydroxy substance and higher fatty acid combined in such proportion as to yield esters of molecular formula containing two or more unesterified hydroxyl groups, at least one of said groups residing in the polyhydroxy radical, the amount of the hydroxy fatty ester being sufficient to effect substantial reduction in shrinkage at the end of baking of cakes containing more sugar than flour in which the shortening is incorporated.

26. The process of improving dry plastic triglyceride shortening which consists essentially in replacing at least 2% of the triglyceride with an ester having a molecular formula containing at least two unesterified hydroxyl groups and consisting of polyhydric alcohol incompletely esterified with higher fatty acid, such ester functioning to effect substantial increase in the volume of cakes prepared with shortening and from a batter containing much more sugar than flour.

HERBERT S. COITH.
ALBERT S. RICHARDSON.
VERLING M. VOTAW.